United States Patent
Satoh

(10) Patent No.: US 10,431,091 B2
(45) Date of Patent: Oct. 1, 2019

(54) DEVICE FOR CONTROLLING VEHICLE TRAVEL

(71) Applicant: Hitachi Automotive Systems, Ltd., Hitachinaka-shi, Ibaraki (JP)

(72) Inventor: Seiichi Satoh, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 268 days.

(21) Appl. No.: 15/309,939

(22) PCT Filed: Jun. 1, 2015

(86) PCT No.: PCT/JP2015/065715
§ 371 (c)(1),
(2) Date: Nov. 9, 2016

(87) PCT Pub. No.: WO2015/190329
PCT Pub. Date: Dec. 17, 2015

(65) Prior Publication Data
US 2017/0162051 A1    Jun. 8, 2017

(30) Foreign Application Priority Data
Jun. 12, 2014 (JP) ................................ 2014-121421

(51) Int. Cl.
*G08G 1/16* (2006.01)
*B60W 50/02* (2012.01)
(Continued)

(52) U.S. Cl.
CPC .............. *G08G 1/162* (2013.01); *B60R 21/00* (2013.01); *B60T 7/122* (2013.01); *B60T 8/885* (2013.01);
(Continued)

(58) Field of Classification Search
None
See application file for complete search history.

(56) References Cited

U.S. PATENT DOCUMENTS

| 5,415,142 A | 5/1995 | Tsubakiji et al. |
| 6,064,319 A * | 5/2000 | Matta ........................ G08G 1/07 340/902 |

(Continued)

FOREIGN PATENT DOCUMENTS

| CN | 101113901 A | 1/2008 |
| CN | 102013174 A | 4/2011 |

(Continued)

OTHER PUBLICATIONS

Chinese-language Office Action issued in counterpart Chinese Application No. 201580028580.8 dated Mar. 11, 2019 with English translation (32 pages).

(Continued)

*Primary Examiner* — Shelley Chen
(74) *Attorney, Agent, or Firm* — Crowell & Moring LLP

(57) ABSTRACT

To provide a device for controlling vehicle travel with which it is possible, when a host vehicle has malfunctioned, to prevent accidents and secondary disasters caused by the vehicle malfunction. The device for controlling travel is provided with: a malfunction detector for detecting the presence/absence of malfunctions in a variety of devices for assisting the driving of the host vehicle; a malfunction degree determining unit for specifying, when the malfunction detector detects a malfunction in any of the devices, the malfunction state of the device and determining whether or not the device can be driven; and an action instruction unit for generating, on the basis of determination information from the malfunction degree determining unit, an instruction signal for communicating an action instruction for another (Continued)

vehicle, and outputting the instruction signal out of the host vehicle.

7 Claims, 7 Drawing Sheets

(51) Int. Cl.
| | | |
|---|---|---|
| *B60T 17/22* | (2006.01) | |
| *B60R 21/00* | (2006.01) | |
| *G08G 1/09* | (2006.01) | |
| *G08G 1/0965* | (2006.01) | |
| *G01C 21/34* | (2006.01) | |
| *G01C 21/36* | (2006.01) | |
| *G05D 1/00* | (2006.01) | |
| *G05D 1/02* | (2006.01) | |
| *G08G 1/087* | (2006.01) | |
| *B60T 7/12* | (2006.01) | |
| *B60T 8/88* | (2006.01) | |
| *G08G 1/0967* | (2006.01) | |
| *B60T 7/16* | (2006.01) | |
| *G07C 5/00* | (2006.01) | |
| *G07C 5/08* | (2006.01) | |

(52) U.S. Cl.
CPC ............ *B60T 17/22* (2013.01); *B60W 50/02* (2013.01); *G01C 21/3415* (2013.01); *G01C 21/3602* (2013.01); *G05D 1/0011* (2013.01); *G05D 1/0214* (2013.01); *G05D 1/0276* (2013.01); *G08G 1/087* (2013.01); *G08G 1/09* (2013.01); *G08G 1/0965* (2013.01); *G08G 1/096725* (2013.01); *G08G 1/096791* (2013.01); *G08G 1/16* (2013.01); *G08G 1/166* (2013.01); *B60T 7/16* (2013.01); *B60T 2201/022* (2013.01); *B60T 2201/08* (2013.01); *B60T 2270/402* (2013.01); *G05D 1/0236* (2013.01); *G05D 1/0257* (2013.01); *G07C 5/008* (2013.01); *G07C 5/0808* (2013.01); *G07C 5/0816* (2013.01)

(56) References Cited

U.S. PATENT DOCUMENTS

| | | | |
|---|---|---|---|
| 6,278,360 | B1 | 8/2001 | Yanagi |
| 6,556,148 | B2 * | 4/2003 | Ellis ................ A61H 3/061 340/906 |
| 7,042,345 | B2 * | 5/2006 | Ellis ................ A61H 3/061 340/436 |
| 2002/0126022 | A1 * | 9/2002 | Ellis ................ A61H 3/061 340/901 |
| 2003/0063015 | A1 | 4/2003 | Ebner et al. |
| 2004/0090117 | A1 | 5/2004 | Dudeck et al. |
| 2004/0145496 | A1 * | 7/2004 | Ellis ................ A61H 3/061 340/905 |
| 2005/0131627 | A1 | 6/2005 | Ignatin |
| 2005/0176528 | A1 * | 8/2005 | Shai ................ A63B 5/04 473/490 |
| 2007/0188348 | A1 | 8/2007 | Bauer et al. |
| 2007/0244643 | A1 | 10/2007 | Tengler et al. |
| 2008/0140287 | A1 | 6/2008 | Yang et al. |
| 2010/0019891 | A1 | 1/2010 | Mudalige |
| 2010/0309023 | A1 * | 12/2010 | Busch ................ G08G 1/07 340/917 |
| 2011/0109478 | A1 | 5/2011 | Williamson et al. |
| 2013/0083722 | A1 * | 4/2013 | Bhargava ............ H04W 48/20 370/315 |

FOREIGN PATENT DOCUMENTS

| | | | |
|---|---|---|---|
| CN | 201941764 U | | 8/2011 |
| CN | 102194324 A | | 9/2011 |
| CN | 202171874 U | * | 3/2012 |
| CN | 202694590 U | | 1/2013 |
| CN | 103794086 A | | 5/2014 |
| DE | 102 42 843 A1 | | 4/2004 |
| DE | 10 2011 077 952 A1 | | 12/2012 |
| EP | 1 288 883 A1 | | 3/2003 |
| JP | 6-264804 A | | 9/1994 |
| JP | 2000-113384 A | | 4/2000 |
| JP | 2000-190757 A | | 7/2000 |
| JP | 2000-289459 A | | 10/2000 |
| JP | 2002-222491 A | | 8/2002 |
| JP | 2003-63373 A | | 3/2003 |
| JP | 2004-504216 A | | 2/2004 |
| JP | 2005-227978 A | | 8/2005 |
| JP | 2005-235240 A | | 9/2005 |
| JP | 2007-233965 A | | 9/2007 |
| JP | 2007-257519 A | | 10/2007 |
| JP | 2007-293625 A | | 11/2007 |
| JP | 2007293625 A | * | 11/2007 |
| JP | 2008-1286 A | | 1/2008 |
| JP | 2010-146079 A | | 7/2010 |
| JP | 2011-157051 A | | 8/2011 |
| JP | 2011-202736 A | | 10/2011 |
| JP | 2011-210095 A | | 10/2011 |
| JP | 2011-221853 A | | 11/2011 |
| JP | 2013-79068 A | | 5/2013 |

OTHER PUBLICATIONS

Japanese-language Office Action issued in counterpart Japanese Application No. 2016-527746 dated Sep. 5, 2017 with English translation (9 pages).
Japanese-language Office Action issued in counterpart Japanese Application No. 2016-527746 dated Feb. 27, 2018 with unverified English translation (six pages).
Partial Supplementary European Search Report issued in counterpart European Application No. 15807514.3 dated Jan. 30, 2018 (12 pages).
International Search Report (PCT/ISA/210) issued in PCT Application No. PCT/JP2015/065715 dated Sep. 15, 2015 with English-language translation (two (2) pages).
Japanese-language Written Opinion (PCT/ISA/237) issued in PCT Application No. PCT/JP2015/065715 dated Sep. 15, 2015 (three (3) pages).
Extended European Search Report issued in counterpart European Application No. 15807514.3 dated May 29, 2018 (thirteen (13) pages).
Chinese-language Office Action issued in counterpart Chinese Application No. 201580028580.8 dated Sep. 6, 2018 with English translation (27 pages).
Japanese-language Office Action issued in counterpart Japanese Application No. 2018-083076 dated May 7, 2019 with English translation (eight (8) pages).

* cited by examiner

FIG. 8
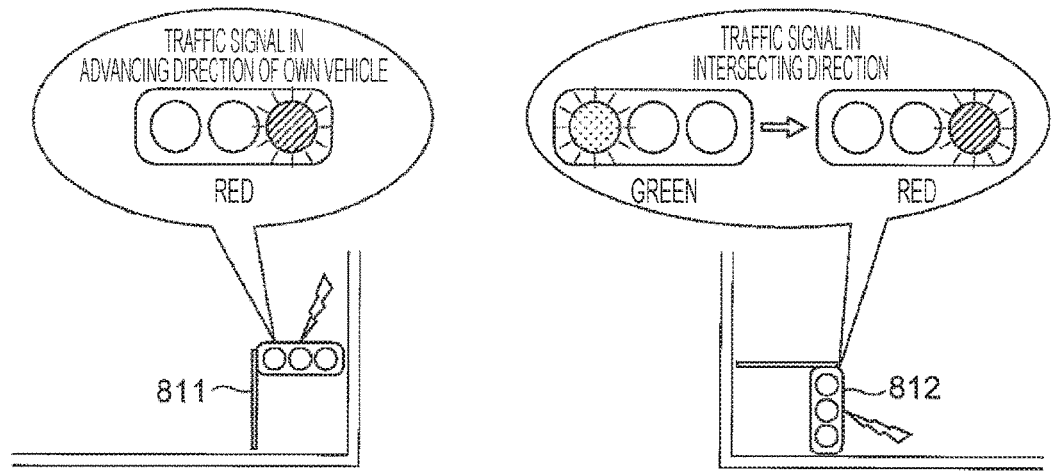
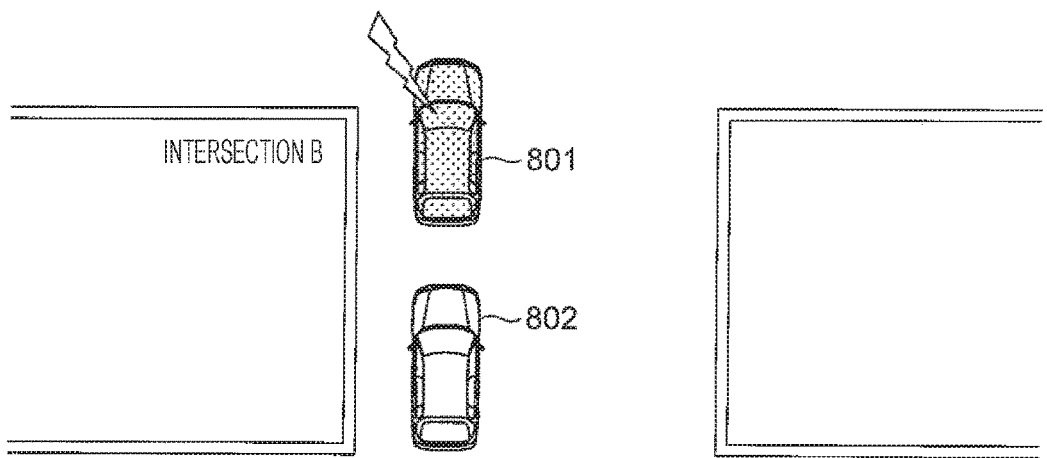
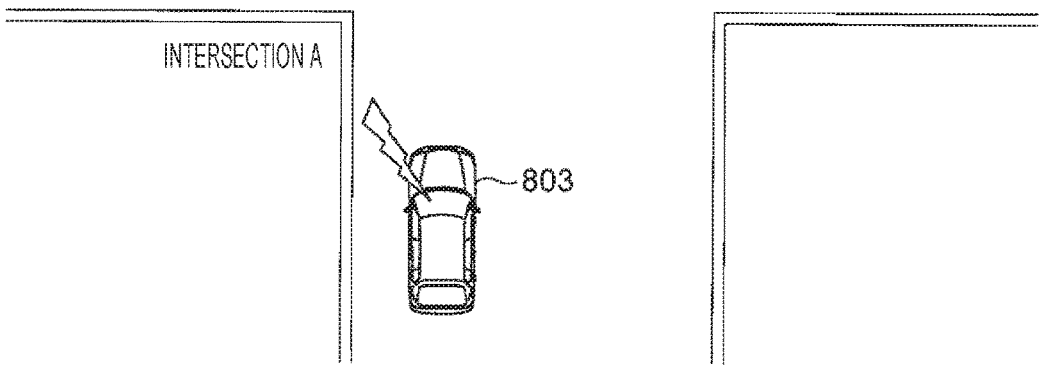

DEVICE FOR CONTROLLING VEHICLE TRAVEL

TECHNICAL FIELD

The present invention relates to a device for controlling vehicle travel which restricts another vehicle from entering a traveling route of an own vehicle when various types of devices for supporting driving of the own vehicle are malfunctioned.

BACKGROUND ART

In recent years, there is proposed a system for notifying a malfunction to a driver and passengers in a vehicle through a voice and a display when the vehicle detects that various types of devices (for example, various types of actuators such as a steering actuator, a brake actuator, and an accelerator actuator, and external recognition devices such as a laser device and a camera) for supporting driving of a vehicle are malfunctioned.

In addition, there is proposed a technique in which a control is interrupted when the vehicle detects that a driving support system such as an adaptive cruise control (ACC) and a pre-crash safety system is malfunctioned in operation.

By the way, PTL 1 discloses a driving support device to implement a driving support, which determines a driving support type on the basis of a conflict margin time calculated according to a target and the vehicle and an estimated risk degree indicating a degree of possibility that the vehicle moves onto a predicted route in order to cause a driver of the vehicle to avoid the target of a risk in the vehicle driving in a case where the vehicle is malfunctioned, and controls one or more devices for the driving support on the basis of the determined driving support type.

In addition, PTL 2 discloses a vehicle automatic braking and steering system in which an avoidance route is determined when there is an obstacle on the route of the vehicle in order to implement an automatic avoidance unit at a maximum safety level, and a procedure for determining the avoidance route is applied one more time when there is another obstacle in the avoidance route.

CITATION LIST

Patent Literature

PTL 1: JP 2011-210095 A
PTL 2: JP 2004-504216 A

SUMMARY OF INVENTION

Technical Problem

In any of the technologies disclosed in PTLs 1 and 2, the travel control of the own vehicle is performed after a malfunction device of the own vehicle is detected, but an instruction signal for avoiding an accident caused by a malfunction of the own vehicle is not transmitted to the other vehicle or a traffic signal outside the own vehicle.

For example, a technology of performing an automatic notification and of notifying of the malfunction vehicle to surrounding environments using a hazard lamp or a horn in a case where the own vehicle is malfunctioned.

In other words, information indicating that the own vehicle is malfunctioned is notified to the outside, but information on a degree of the malfunction is not notified to the outside, and only the driver and passengers of the own vehicle are notified with the information.

Even if the information indicating that the own vehicle is malfunctioned is notified using the hazard lamp and the horn, it cannot be said that all the traffic participants (surrounding vehicles and pedestrians) recognize the notification information as dangerous. Therefore, there may be a case where the traffic participants surrounding the malfunction vehicle only know about that there is a malfunction vehicle, or could not even aware of that there is a malfunction vehicle. For example, there may be a case of conflict accident in which the other traffic participant could not aware of the fact that a malfunction vehicle which cannot be stopped due to a brake malfunction approaches, and thus cannot avoid the vehicle leading to a conflict accident.

An object of the invention is to provide a device for controlling vehicle travel which can prevent an accident and a secondary disaster caused by a malfunction of the own vehicle in a case where the own vehicle is malfunctioned.

Solution of Problem

In order to achieve the object, a device for controlling vehicle travel according to the present invention includes: a malfunction detector that detects malfunctions of various types of devices for supporting driving of an own vehicle; a malfunction degree determining unit, when the malfunction detector detects that any device is malfunctioned, that specifies a malfunction state of the device and determines whether the device is driven; and an action instruction unit that generates an instruction signal for changing an operation of another vehicle on the basis of determination information of the malfunction degree determining unit, and outputs the instruction signal outside the own vehicle.

Advantageous Effects of Invention

According to a device for controlling vehicle travel of the invention, it is possible to prevent an accident and a secondary disaster caused by a malfunction of an own vehicle by generating an instruction signal for changing an operation of another vehicle and outputting the instruction signal to other vehicles and infrastructure machines outside the own vehicle.

BRIEF DESCRIPTION OF DRAWINGS

FIG. 8 is a diagram illustrating the second embodiment of an intersection to which the device for controlling travel of the invention is applied.

DESCRIPTION OF EMBODIMENTS

Hereinafter, embodiments of a device for controlling vehicle travel of the invention with reference to the drawings.

(Configuration of Device for Controlling Travel and Configuration of System Equipped with Device for Controlling Travel)

Figure 1:
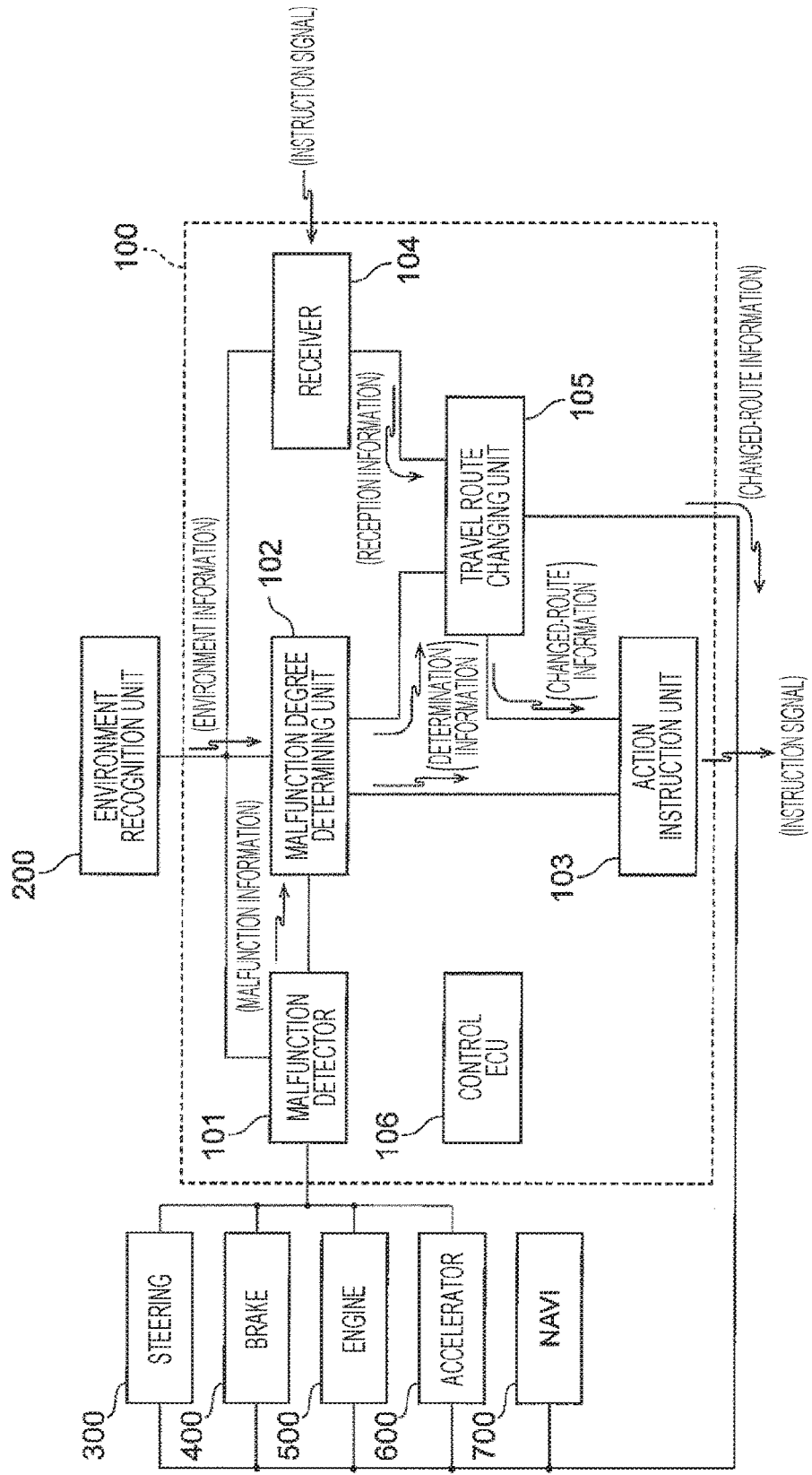
FIG. 1 is a diagram illustrating a configuration of a vehicle which includes a device for controlling travel of the invention.

FIG. 1 is a diagram illustrating a configuration of a vehicle equipped with the device for controlling travel of the invention. A device for controlling travel 100 is provided with a malfunction detector 101, a malfunction degree determining unit 102, an action instruction unit 103, a receiver 104, a travel route changing unit 105, and a control ECU 106.

The malfunction detector 101 detects a malfunction of various types of devices, such as a steering 300 (steering device), a brake 400, an engine 500, an accelerator 600, and a NAVI 700 (car navigator), which support driving of the vehicle.

Further, "various types of devices" of this specification includes all of actuators (corresponding to the steering 300) which support the driving of the vehicle, and devices (corresponding to environment recognition unit 200) such as a sensor and a camera.

Environment information from the environment recognition unit 200 is transmitted to the malfunction degree determining unit 102. Herein, the environment recognition unit 200 includes all devices which can recognize infrastructure facilities (a road sign, a road white line, an intersection, and a traffic signal color) in addition to a distance between the vehicle and an obstacle around the vehicle such as a stereo camera, a monocular camera, a millimeter wave radar, and a laser radar.

Further, the "traffic signal" also includes a traffic signal installed in a railway crossing, and a travel possibility indicator in an automatic lane switching road where a travel possible lane is changed depending on time zones in addition to the traffic signal installed in the road.

The malfunction degree determining unit 102 acquires malfunction information of any one or some of various types of devices which is transmitted from the malfunction detector 101, specifies a malfunction state on the basis of the acquired malfunction information, determines whether a malfunction device is driven, and generates determination information.

Herein, the "malfunction degree" is information containing a detailed malfunction state of the malfunction device, data indicating whether the malfunction device is driven, and a cause of the malfunction.

The action instruction unit 103 acquires the determination information transmitted from the malfunction degree determining unit 102, generates an instruction signal which is output to the outside of an own vehicle, and outputs (transmits) the generated instruction signal.

Herein, the "outside of the own vehicle" includes another vehicle surround the own vehicle (in all directions of the own vehicle), and the traffic signal in front of the own vehicle in the traveling direction.

The receiver 104 receives the instruction signal transmitted from the action instruction unit 103 equipped in the other vehicle.

The travel route changing unit 105 acquires the determination information transmitted from the malfunction degree determining unit 102 and the reception information transmitted from the receiver 104, and estimates a future route where the own vehicle equipped with the malfunction device will not cause an accident with the other vehicle.

Information (changed-route information) on the changed route of the own vehicle generated by the travel route changing unit 105 is transmitted to the action instruction unit 103, and also transmitted to various types of devices such as the steering 300 and the brake 400 because there is a need to feed the information back to a driver of the own vehicle and the control ECU 106. Further, the travel route changing unit 105 and various types of devices are connected through a CAN (Controller Area Network) at the time of the transmission.

The control ECU 106 is a device which controls driving of components of the device for controlling travel 100, and is configured by memory devices such as a CPU, a ROM, and a RAM, and input/output interfaces.

(Processing Flow in Malfunction Degree Determining Unit)

Figure 2:
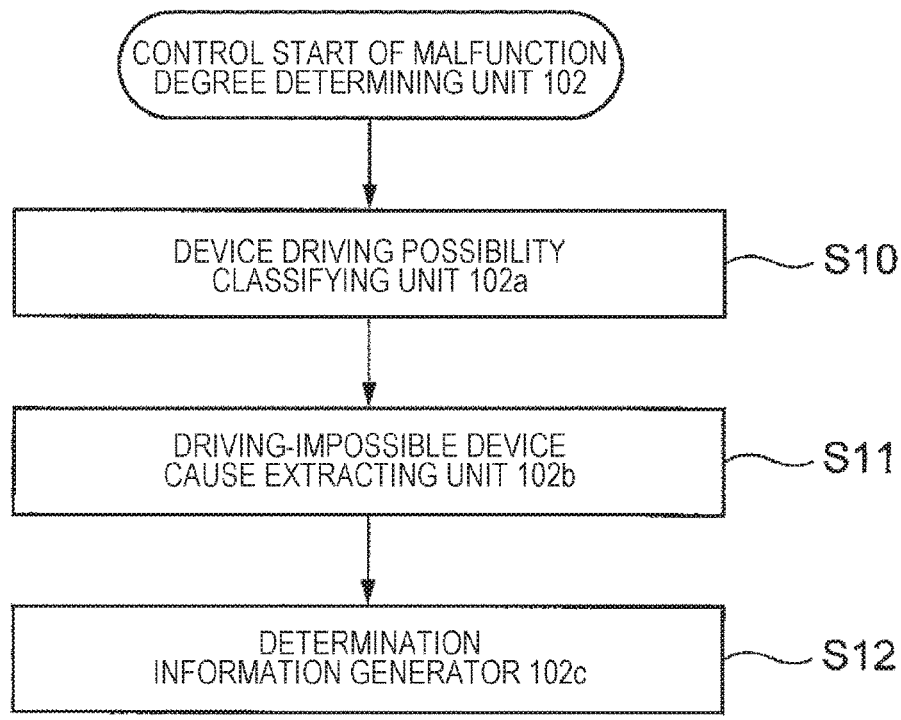
FIG. 2 is a diagram illustrating a processing flow in a malfunction degree determining unit.

FIG. 2 is a diagram illustrating a processing flow in the malfunction degree determining unit. The malfunction degree determining unit 102 is provided with a device driving possibility classifying unit 102a and a driving-impossible device cause extracting unit 102b.

First, the malfunction states of various types of devices such as the environment recognition unit 200 and the steering 300 which are detected by the malfunction detector 101 are acquired by the device driving possibility classifying unit 102a, and are classified into a driving possible state or a driving impossible state (Step S10).

In a case where a device is classified into the driving possible state, detailed malfunction information of the device is extracted by the driving-impossible device cause extracting unit 102b (Step S11).

On the basis of the detailed malfunction information thus extracted, the determination information is generated by a determination information generator 102c (Step S12).

Herein, the malfunction of the steering 300 is that the steering 300 does not work because the vehicle fails to receive a turning command when a driver rotates a handle to output the turning command or to output the turning command during an automatic driving in order to avoid an obstacle, turn a curve, or make a right/left turn.

In addition, the malfunction of the brake 400 is that a brake-fluid-pressure command value is kept in a constant value and the vehicle is not decelerated while not receiving a change in that value regardless of a case where the driver or the vehicle in automatic driving pushes a pedal to output a brake-fluid-pressure command, and contrarily the brake 400 is not released.

In addition, the malfunction of the engine 500 is that a frequency of the engine is not increased, or a defect is generated when the vehicle equipped with an engine automatic stop function such as an idle stop performs the function.

Furthermore, the malfunction of the accelerator 600 is that the accelerator 600 is left in a state of being opened regardless of a case where the accelerator 600 is not pushed, and contrarily a command is not issued to the accelerator 600 and thus the acceleration is failed even though being tried. Herein, an example of the detailed malfunction information is shown in the following Table 1.

TABLE 1

| Actuator/device name | Detailed malfunction information |
|---|---|
| Brake | Not operating/working on |
| Accelerator | Not opening/not closing |
| Steering | Not turning |
| Engine | Frequency is not increasing |

The detailed malfunction information includes information on whether various types of devices can be driven and also information indicating a type of the malfunction.

For example, the detailed malfunction information of the brake 400 is information indicating that the brake 400 does not work and cannot make deceleration, or information indicating that the brake 400 is kept on working regardless of a case where the driver or the automatically-driving vehicle transmits a command to the brake 400.

The detailed malfunction information of the accelerator 600 is information indicating that the accelerator 600 does not work and cannot make acceleration, or information indicating that the accelerator 600 is kept on working and cannot make deceleration regardless of a case where the driver or the automatically-driving vehicle transmits a command to the accelerator 600.

The detailed malfunction information of the steering 300 is information indicating that the turning cannot be made regardless of a case where the driver or the automatically-driving vehicle transmits a command to the steering.

The detailed malfunction information of the engine 500 is information indicating that a valve does not open on the basis of a command transmitted from the accelerator 600 or the brake 400, or the frequency of the engine is not increased even though the valve normally operates. Further, in the vehicle having the engine automatic stop function such as an idling stop, information indicating that the engine does not startup from an engine stop state is also included in the detailed malfunction information.

The detailed malfunction information of the environment recognition unit 200 is information indicating that a distance from the environment recognition unit 200 monitoring the circumference of the vehicle to a surrounding obstacle cannot be acquired, or information indicating that color information is not obtained in a case where the environment recognition unit 200 is a camera which can acquire the color information of the surrounding environment.

(Processing Flow of Travel Route Changing Unit and Action Instruction Unit)

Figure 3:
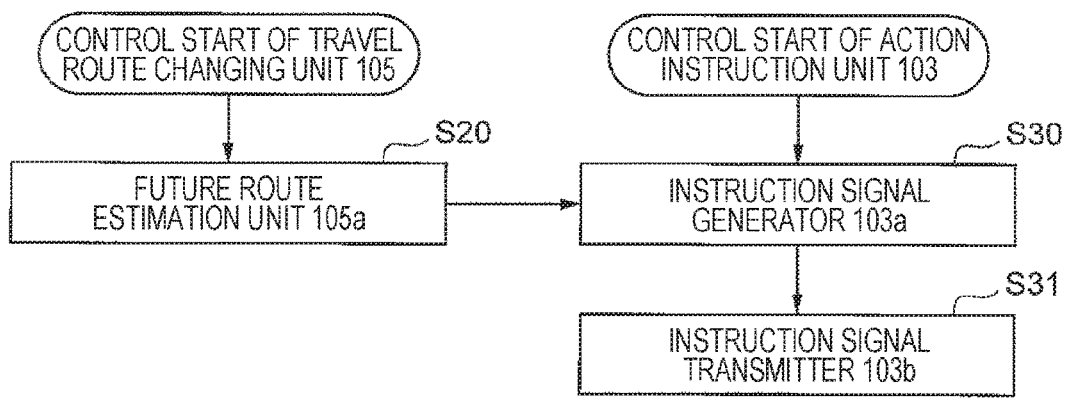
FIG. 3 is a diagram illustrating a processing flow in a travel route changing unit and an action instruction unit.

FIG. 3 is a diagram illustrating a processing flow in the travel route changing unit and the action instruction unit. The travel route changing unit 105 is provided with a future route estimation unit 105a. The future route estimation unit 105a estimates a route which will be traveled by the own vehicle equipped with the malfunction device (that is, a future route) on the basis of the determination information determined in the malfunction degree determining unit 102 (Step S20).

In the estimation of the future route, the environment recognition unit 200 may recognize a situation of obstacles and infrastructure facilities around the own vehicle (a color of the traffic signal, the presence/absence of a railway crossing, etc.), and may use mapping data in local map information.

On the other hand, the action instruction unit 103 is provided with an instruction signal generator 103a and an instruction signal transmitter 103b, transmits the future route of the own vehicle estimated by the future route estimation unit 105a to the instruction signal generator 103a, and generates the instruction signal according to a traffic situation about the other vehicle and the infrastructure facilities contained in the estimated route (Step S30).

The generated instruction signal is transmitted by a vehicle-to-vehicle communication or a road-to-vehicle communication according to a transmission destination through the instruction signal transmitter 103b (Step S31). In addition, the generated instruction signal may be transmitted by a transmission method using a transportation management server. Herein, an example of the transmitted instruction signal is shown in the following Table 2.

TABLE 2

| Target | Example of instruction signal |
|---|---|
| Surrounding vehicle | Keeping route |
|  | Changing route |
|  | Deceleration/stop |
|  | Acceleration |
| Traffic signal | Changing color |

In this way, in the case of the illustrated device for controlling travel 100 and the vehicle equipped with the device, the own vehicle recognizes the surrounding situation, and transmits the instruction signal determined according to the malfunction degree of the malfunction device to the other vehicle and the infrastructure machines when various types of devices of the own vehicles are malfunctioned. Therefore, it is possible to effectively prevent an accident and a secondary disaster.

(First Application of Device for Controlling Travel of the Invention)

Figure 4:
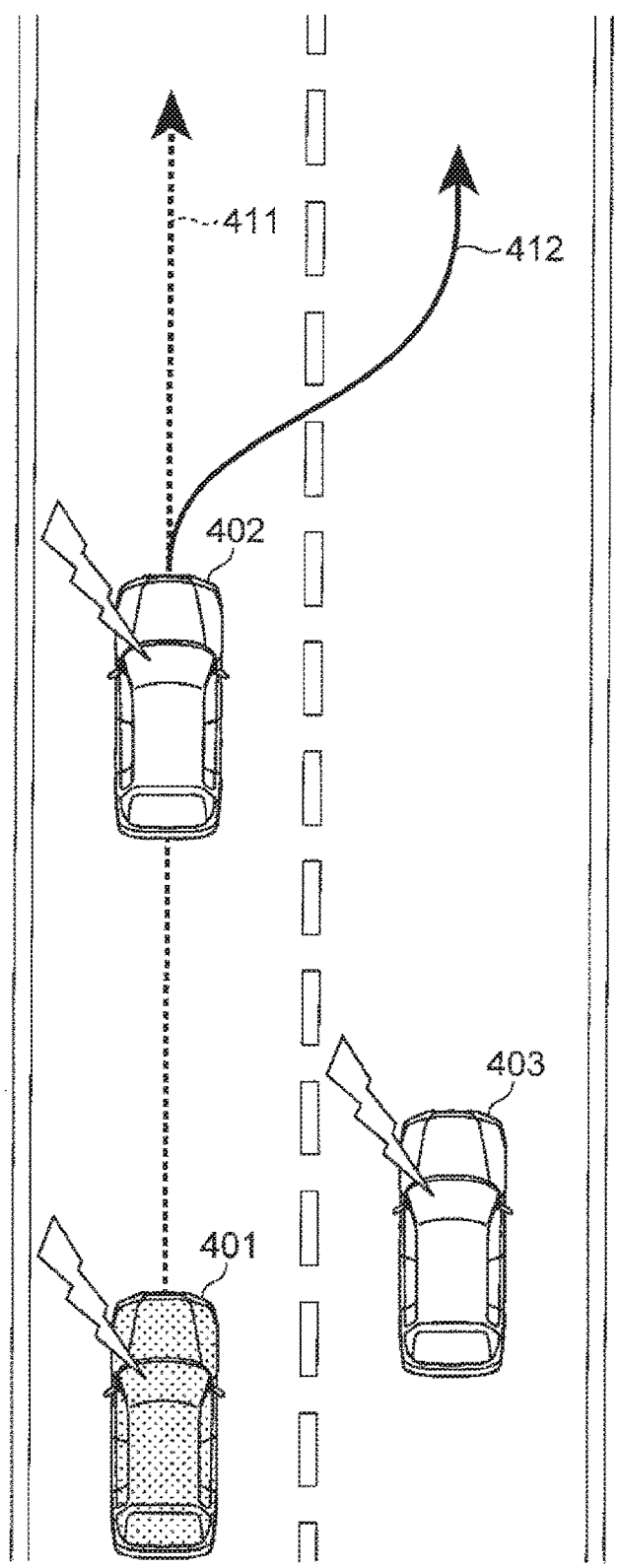
FIG. 4 is a diagram illustrating a first embodiment of an automobile road to which the device for controlling travel of the invention is applied.

FIG. 4 is a diagram illustrating a first embodiment of an automobile road to which the device for controlling travel 100 is applied. In this application, a vehicle 401 corresponds to the own vehicle in which a malfunction occurs, and there are preceding vehicles 402 and 403 around the malfunction vehicle, and these vehicles are traveling in the same direction.

The vehicle 401 detects that the brake 400 is not operated and recognizes that the other devices are normal regardless of the fact that the malfunction detector 101 outputs a brake-fluid-pressure command.

In this case, the detailed malfunction information of the brake 400 specifies "the brake fluid pressure is not confirmed, and the deceleration cannot be made" by the malfunction degree determining unit 102.

The action instruction unit 103 generates an avoidance route 411 on the basis of the detailed malfunction information of the brake 400 determined by the malfunction degree determining unit 102.

Herein, it can be seen that there is the preceding vehicle 402 on the avoidance route generated by the vehicle 401 from map data containing position information of the preceding vehicle 402 acquired from the environment recognition unit 200 mounted in the vehicle 401.

In a case where the preceding vehicle 402 is traveling at a speed lower than that of the vehicle 401 or stopped, the vehicle 401 having a brake malfunction has a strong possibility to come into conflict with the preceding vehicle.

Therefore, the vehicle 401 generates the instruction signal indicating a lane change to the preceding vehicle 402 or urging a lane change in the action instruction unit 103, and transmits the generated instruction signal, so that it is possible to prevent the secondary disaster due to the conflict.

The vehicle 402 receives the instruction signal in the receiver 104. Then, the travel route changing unit 105 generates a travel route 412 for avoiding the conflict between the vehicle 402 and the malfunction vehicle 401 on the basis of the received instruction signal.

In the case illustrated in FIG. 4, the steering device such as a handle malfunctions, and the other devices are normal, the malfunction vehicle 401 may be stopped in a brake operation without transmitting the instruction signal in order to avoid the conflict with the preceding vehicle 402.

At that time, since the malfunction vehicle 401 may approach the vehicle 403 traveling beside, it is desirable to transmit the instruction signal to the vehicle 403.

(Second Application of Device for Controlling Travel of the Invention)

Figure 5:
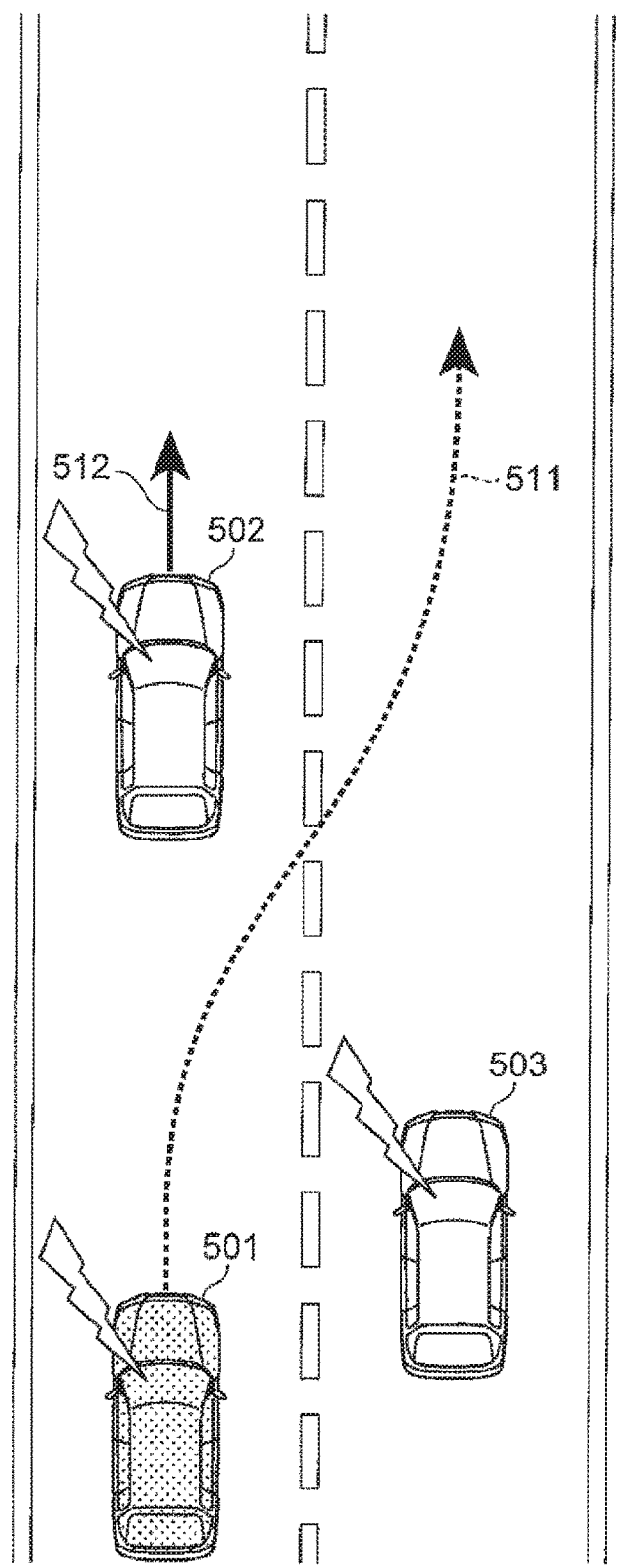
FIG. 5 is a diagram illustrating a second embodiment of the automobile road to which the device for controlling travel of the invention is applied.

FIG. 5 is a diagram illustrating a second embodiment of the automobile road to which the device for controlling travel 100 is applied. This application corresponds to a case where the accelerator 600 of a vehicle 501 has a malfunction such as not opening, and the other devices are normal.

The malfunction vehicle 501 recognizes the presence of a preceding vehicle 502 by the environment recognition unit 200, and generates an avoidance route 511 by the travel route changing unit 105 in order to avoid conflict with the preceding vehicle 502.

Herein, the vehicle 501 generates and transmits the instruction signal for deceleration/stop by the action instruction unit 103 in order not to inhibit the avoidance route generated by the malfunction vehicle 501 while not causing the secondary disaster such as the conflict with the vehicles 502 and 503 traveling beside.

The other vehicles 502 and 503 received with the instruction signal for deceleration/stop do not change the traveling route by the travel route changing unit 105 (the route of the other vehicle 502 is 512) but perform the deceleration/stop operation.

(Third Application of Device for Controlling Travel of the Invention)

Figure 6:
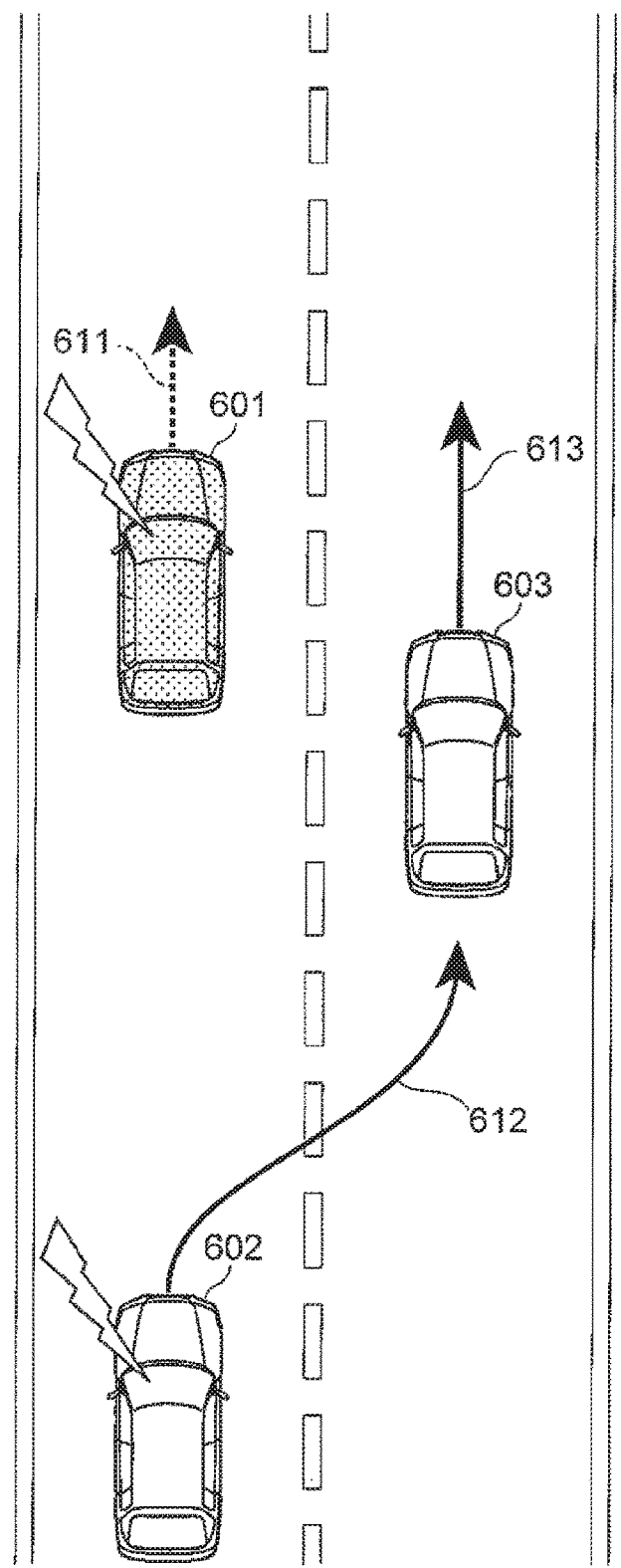
FIG. 6 is a diagram illustrating a third embodiment of the automobile road to which the device for controlling travel of the invention is applied.

FIG. 6 is a diagram illustrating a third embodiment of the automobile road to which the device for controlling travel 100 is applied. This application corresponds to a case where the accelerator 600 of a vehicle 601 has a malfunction such as not opening, and the other devices are normal.

Since the malfunction vehicle 601 is not possible to keep a self-traveling (accelerating) any more, the vehicle searches a shoulder to which the vehicle reaches by inertia or another place where the vehicle can stop using the environment recognition unit 200 or a map, and takes a stopping action.

In a case where it fails to find out a retractable place, the vehicle takes a decelerating/stopping action at that place. At that time, as information transmission to the surrounding vehicle, the malfunction vehicle 601 first transmits the instruction signal to the preceding vehicle to change its operation when there is found a conflict risk on the basis of an inter-vehicle distance and a relative distance between the preceding vehicle and the malfunction vehicle 601 in a case where there is a preceding vehicle traveling in front of the malfunction vehicle 601.

On the other hand, in this drawing, there is a vehicle 602 in the same lane as the malfunction vehicle 601 in rear of the malfunction vehicle 601, and there is a vehicle 603 in the adjacent lane in obliquely rear of the malfunction vehicle 601.

First, an instruction indicating a route change may be given as an example of the instruction signal for changing the operation with respect to the vehicle 602.

The vehicle 602 generates an avoidance route 612 by the travel route changing unit 105 when receiving the instruction signal to change the route which is generated by the malfunction vehicle 601.

Next, an instruction indicating a keeping route may be given as an example of the instruction signal to change the operation with respect to the vehicle 603.

When the vehicle 603 receives the instruction signal indicating the keeping route, the lane change of the vehicle 603 is inhibited until passing the malfunction vehicle 601 ahead.

(Fourth Application of Device for Controlling Travel of the Invention)

Figure 7:
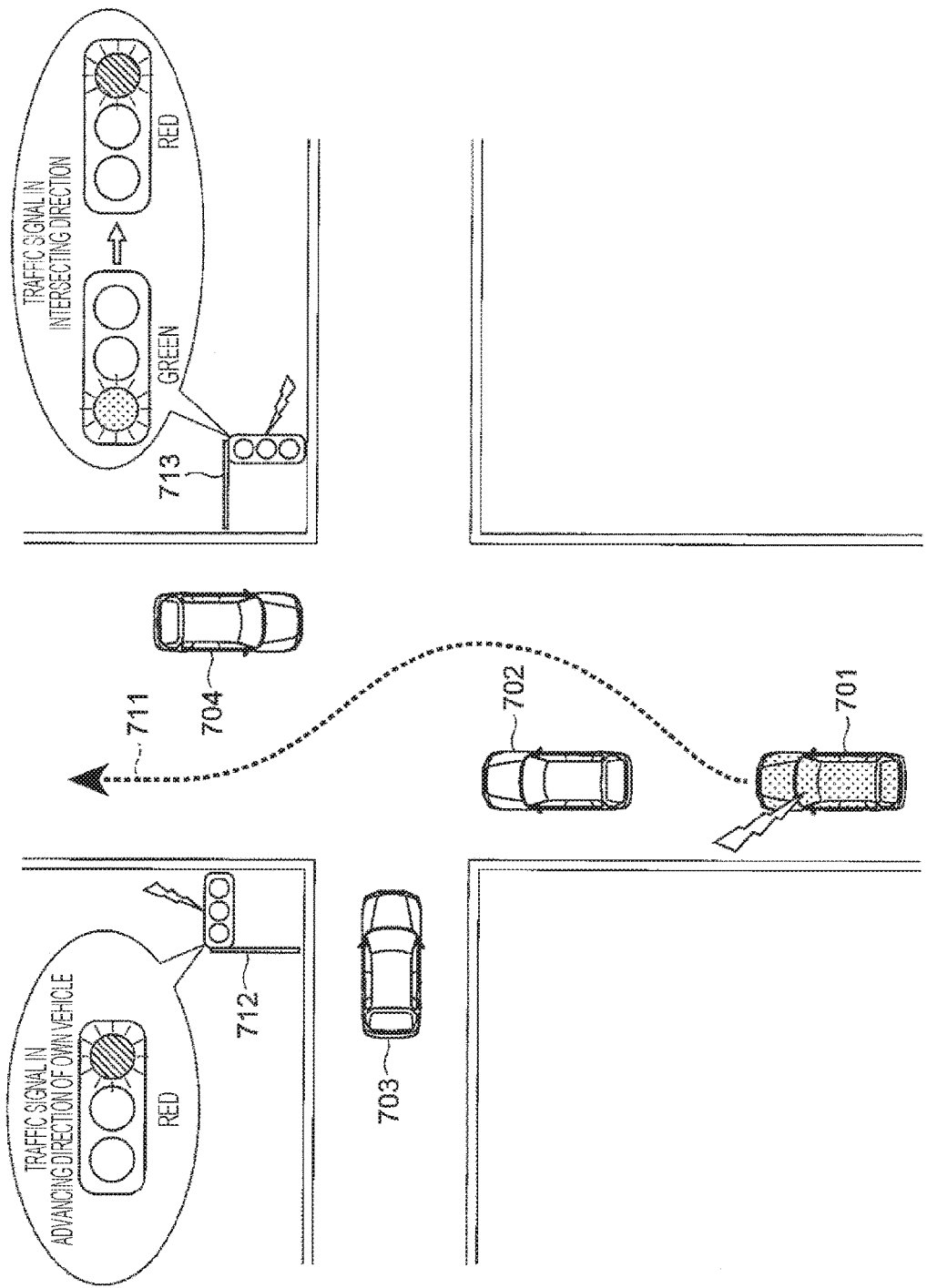
FIG. 7 is a diagram illustrating the first embodiment of an intersection to which the device for controlling travel of the invention is applied.

FIG. 7 is a diagram illustrating the first embodiment of an intersection to which the device for controlling travel 100 is applied. This application corresponds to a case where the device for controlling travel 100 is applied to an intersection. Herein, a vehicle 701 is the own vehicle which causes a malfunction.

In the drawing, the vehicle 701 causes the brake malfunction that the brake 400 does not work, and thus cannot take a deceleration action.

Other vehicles 702 and 704 are stopped before the intersection, and another vehicle 703 advancing in the intersecting direction comes into the intersection in a situation that the traffic signal in the advancing direction of the own vehicle indicates red (advancing not allowed), and the traffic signal in the intersecting direction indicates green (advancing allowed).

The brake malfunction is detected by the malfunction detector 101, and the malfunction degree determining unit 102 specifies that the brake 400 of the vehicle 701 does not work as the malfunction state.

Then, the environment recognition unit 200 mounted in the vehicle 701 recognizes the presence of the preceding vehicles 702 and 704, and the travel route changing unit 105 generates an avoidance route 711.

The avoidance route 711 includes a route of entering the intersection. In this case, when the malfunction vehicle 701 advances along the avoidance route 711, there is a strong possibility to cause a conflict accident with the vehicle 703 advancing in the intersecting direction.

Therefore, in a case where the vehicle enters an intersection where the traffic signals are installed, it is possible to prevent a conflict accident with the other vehicles and pedestrians who are crossing the intersection by setting the colors of the traffic signals in all directions to be red (advancing not allowed).

The malfunction vehicle 701 can safely pass through while preventing the secondary disaster by transmitting an instruction signal for decelerating/stopping to the surrounding other vehicles 702, 703, and 704 through the action instruction unit 103, and by transmitting an instruction signal for changing the colors of the traffic signals at the intersection.

In this way, the example where the traffic signals are installed in the intersection has been described in the case of FIG. 7, but the device for controlling travel 100 where the action instruction unit 103 is equipped may be effectively applied even to the intersection where no traffic signals are installed.

Since the installed traffic signals can be acquired from the NAVI or the local map data, a transmission destination of the instruction signal for changing the operation can be extracted in advance in a case where the intersection is included in the avoidance route of the malfunction vehicle.

Therefore, in a case where the malfunction vehicle enters the intersection having no installed traffic signals, the malfunction vehicle may directly transmit the instruction signal of decelerating/stopping through the vehicle-to-vehicle communication to the vehicle advancing in the intersecting direction.

(Fifth Application of Device for Controlling Travel of the Invention)

FIG. 8 is a diagram illustrating the second embodiment of an intersection to which the device for controlling travel 100 is applied. This application corresponds to a case where a vehicle 801 is malfunctioned and stopped at an intersection B in front of an intersection A where a vehicle 803 is scheduled to advance.

The malfunction vehicle 801 transmits the instruction signal of decelerating/stopping to the surrounding other vehicles through the vehicle-to-vehicle communication.

Although the vehicle 803 has been scheduled to travel the route advancing the intersection A, the travel route changing unit 105 generates a detour route (turning left or right) at the intersection A when receiving the instruction signal for an operation change transmitted by the malfunction vehicle 801.

The instruction signal for the operation change in the respective applications described above has been described such that the malfunction vehicle transmits an instruction signal for causing its own desired operation instruction to the surrounding vehicles or the infrastructure machines. However, only the information of the malfunction degree may be transmitted, and the operation may be determined by the other vehicle or the infrastructure machines which receive the information of the malfunction degree.

In addition, in a case where a vehicle having no function of the vehicle-to-vehicle communication is around the malfunction vehicle, a possibility to make an operation for avoiding the secondary disaster can be searched on the basis of the device which is normally operated even in a case where a plurality of devices for supporting the driving are malfunctioned at the same time.

Further, the device for controlling travel 100 is desirably set to be an operatable state by default, and a user may select permission/inhibition of the operation of the device for controlling travel 100 using a NAVI or a port switch.

REFERENCE SIGNS LIST

100 device for controlling travel
101 malfunction detector
102 malfunction degree determining unit
103 action instruction unit
104 receiver
105 travel route changing unit
106 control ECU
200 environment recognition unit
300 steering
400 brake
500 engine
600 accelerator
700 NAVI

The invention claimed is:

1. A device for controlling vehicle travel, comprising:
a malfunction detector that detects malfunctions of various types of devices for supporting driving of an own vehicle;
a malfunction degree determining unit, when the malfunction detector detects that any device is malfunctioned, that specifies a malfunction state of the device and determines whether the device is driven; and
an action instruction unit that generates an instruction signal for changing an operation of at least one of a traffic signal in front of the own vehicle in a traveling direction thereof and another vehicle based on determination information of the malfunction degree determining unit, and outputs the instruction signal to at least one of the other vehicle and the traffic signal;
wherein the own vehicle includes an environment recognition unit, and
wherein the device for controlling travel includes a receiver that receives an external instruction signal output from the other vehicle, and a travel route changing unit that creates a collision avoidance route of the own vehicle to avoid a collision with the other vehicle based on environment information from the environment recognition unit and the determination information.

2. A device for controlling vehicle travel, comprising:
a malfunction detector that detects malfunctions of various types of devices for supporting driving of an own vehicle;
a malfunction degree determining unit, when the malfunction detector detects that any device is malfunctioned, that specifies a malfunction state of the device and determines whether the device is driven; and
an action instruction unit that generates an instruction signal for changing an operation of at least one of a traffic signal in front of the own vehicle in a traveling direction thereof and another vehicle based on determination information of the malfunction degree determining unit, and outputs the instruction signal to at least one of the other vehicle and the traffic signal;
wherein, in a case where an output destination of the instruction signal is the traffic signal, the own vehicle outputs the instruction signal to turn the traffic signal to red before and after a position of the own vehicle, or outputs the instruction signal to set a turning-on period of a red signal to be long enough for the own vehicle to pass the traffic signal.

3. A device for controlling vehicle travel, comprising:
a malfunction detector that detects malfunctions of various types of devices for supporting driving of an own vehicle;
a malfunction degree determining unit, when the malfunction detector detects that any device is malfunctioned, that specifies a malfunction state of the device and determines whether the device is driven; and
an action instruction unit that generates an instruction signal for changing an operation of at least one of a traffic signal in front of the own vehicle in a traveling direction thereof and another vehicle based on determination information of the malfunction degree determining unit, and outputs the instruction signal to at least one of the other vehicle and the traffic signal;
wherein, in a case where an output destination of the instruction signal is the other vehicle, the own vehicle outputs the instruction signal containing a position where the own vehicle is stopped or passes through while restricting the other vehicle from entering a traveling route of the own vehicle.

4. The device for controlling vehicle travel according to claim 1,
wherein the own vehicle is further configured to change a traveling route to a scheduled destination by the travel route changing unit, and wherein, when the external instruction signal is received from the other vehicle, the traveling route is changed by the travel route changing unit based on position information of the other vehicle to avoid a collision therewith.

5. The device for controlling vehicle travel according to claim 1,
wherein, in a case where an output destination of the instruction signal is the traffic signal, the own vehicle outputs the instruction signal to turn the traffic signal to red before and after a position of the own vehicle, or outputs the instruction signal to set a turning-on period of a red signal to be long enough for the own vehicle to pass the traffic signal.

6. The device for controlling vehicle travel according to claim 1,
wherein, in a case where an output destination of the instruction signal is the other vehicle, the own vehicle outputs the instruction signal containing a position where the own vehicle is stopped or passes through while restricting the other vehicle from entering a traveling route of the own vehicle.

7. The device for controlling vehicle travel according to claim 6,
wherein the own vehicle is further configured to change a traveling route to a scheduled destination by the travel route changing unit, and
wherein, when the external instruction signal is received from the other vehicle, the traveling route is changed by the travel route changing unit based on stop position information of the other vehicle.

* * * * *